(12) United States Patent
Koh

(10) Patent No.: US 6,279,702 B1
(45) Date of Patent: Aug. 28, 2001

(54) SHOCK ABSORBER USING A HYDRAULIC FLUID AND A MAGNETORHEOLOGICAL FLUID

(75) Inventor: You-Seok Koh, Pyungtaek-Si (KR)

(73) Assignee: Mando Corporation, Kyonggi-Do (KR)

( * ) Notice: Subject to any disclaimer, the term of this patent is extended or adjusted under 35 U.S.C. 154(b) by 0 days.

(21) Appl. No.: 09/755,807

(22) Filed: Jan. 5, 2001

(51) Int. Cl.[7] .................................................... F16F 9/04
(52) U.S. Cl. ............................................................ 188/267.2
(58) Field of Search .................. 267/140.14, 140.15; 188/267.2

(56) References Cited

U.S. PATENT DOCUMENTS

| | | | |
|---|---|---|---|
| 5,284,330 | * | 2/1994 | Carlson et al. ................. 267/140.14 |
| 5,366,048 | * | 11/1994 | Watanabe et al. ................ 188/267.2 |
| 5,398,917 | * | 3/1995 | Carlson et al. ................. 267/140.14 |
| 5,632,361 | * | 5/1997 | Wulff et al. ....................... 188/267.2 |
| 5,878,851 | * | 3/1999 | Carlson et al. ...................... 188/269 |
| 5,947,238 | * | 9/1999 | Jolly et al. ........................ 188/267.1 |
| 6,095,486 | * | 8/2000 | Ivers et al. ........................ 188/267.2 |
| 6,131,709 | * | 10/2000 | Jolly et al. ........................ 188/267.2 |

FOREIGN PATENT DOCUMENTS

| | | | | |
|---|---|---|---|---|
| 000335016 | * | 10/1989 | (EP) | .................................. 188/267.2 |
| 63-180742 | * | 7/1988 | (JP) | .................................. 188/267.2 |

* cited by examiner

Primary Examiner—Christopher P. Schwartz
(74) Attorney, Agent, or Firm—Anderson, Kill & Olick, P.C.

(57) ABSTRACT

A shock absorber includes a housing, a cylinder, a piston rod, a piston and a chamber. The housing has an inner space containing a hydraulic fluid. The cylinder has an upper room filled with a magnetorhelogical fluid and a lower room filled with the hydraulic fluid. The piston rod is movably inserted in the upper room of the cylinder. The piston is movably inserted in the lower room of the cylinder, secured to the piston rod and structured to form a magnetic field generator. The chamber is mechanically connected to the piston rod. The piston rod further includes at least first orifice for providing a flowing path for the magnetorheological fluid and the piston further includes at least a second orifice for providing a flowing path for the hydraulic fluid in the lower room of cylinder. The shock absorber utilizes the hydraulic fluid and the magnetorheological fluid, which can, in turns, can respond sensitively to the impulse applied thereto by using the hydraulic fluid having relatively low viscosity and, at the same time, can modulate the damping force by using the magnetorheological fluid having changeable viscosity.

12 Claims, 6 Drawing Sheets

SHOCK ABSORBER USING A HYDRAULIC FLUID AND A MAGNETORHEOLOGICAL FLUID

FIELD OF THE INVENTION

The present invention relates to a shock absorber for use in a motor vehicle; more particularly, to a shock absorber using a magnetorheological (MR) fluid and a hydraulic fluid.

BACKGROUND OF THE INVENTION

Typically, motor vehicles are equipped with a suspension system to improve road-adherence and to provide ride-comfort for occupants. The suspension system includes springs and shock absorbers. The shock absorbers are disposed in parallel with the springs to damp the vibration of the springs.

The shock absorbers utilize a fluid flow system incorporating therein either a hydraulic fluid having a constant viscosity or a fluid having a changeable viscosity, e.g., magnetorheological (MR) fluid. The use of MR fluid is advantageous in that the viscosity thereof can be controlled with the application of a magnetic field in order to adjust a damping force being exerted on the springs depending on a traveling condition.

Particularly, MR fluid is a free-flowing liquid with a viscosity. Exposure to a magnetic field can transform the liquid into a near-solid in milliseconds; and with the removal of the magnetic field, the fluid can be returned to its liquid state just as quickly. The degree of change in the viscosity of the MR fluid is proportional to the magnitude of the applied magnetic field.

FIGS. 1 and 2 are a cross sectional view illustrating a conventional shock absorber using an MR fluid and an enlarged cross sectional view depicting a piston assembly shown in FIG. 1, respectively, disclosed in U.S. Pat. No. 5,284,330 entitled "MAGNETORHEOLOGICAL FLUID DEVICE" issued on Jan. 11, 1994.

The shock absorber 10 comprises two principal components: a housing 20 and a piston assembly 30. The housing 20 includes a volume of magnetorheological (MR) fluid. The fluid includes carbonyl iron particles suspended in silicone oil.

The housing 20 is generally of a cylindrical tube with a first closed end 22. A cylindrical sleeve 25 may be affixed to an inner cylinder by any conventional means, e.g., press fit, welding or adhesive to increase the cross-sectional surface area of the housing 20. The cylinder is closed at a second end thereof by an end member 26. A first seal 27 extends about an outer periphery of the end member 26 to prevent fluid leakage between the housing 20 and the end member 26. A second annular seal 28 is housed in a groove in an inner periphery of the end member 26 and seals against a piston rod 32. A scraper 29 can be used to wipe the MR fluid off the surface of piston rod 32 so as to minimize the loss of MR fluid past the second annular seal 28.

The housing 20 is provided with a floating piston 21 to separate the MR fluid from a pressurized accumulator 23. The pressurized accumulator 23 is necessary to accommodate a fluid displaced by the piston rod 32 as well as to allow for thermal expansion of the fluid.

The piston assembly 30 is shown in greater detail in FIG. 2. A piston head 34 is spool shaped with an upper outwardly extending flange 36 and a lower outwardly extending flange 38. A coil 40 is wound upon the spool-shaped piston head 34 between the upper flange 36 and the lower flange 38. The piston head 34 is made of a magnetically permeable material, such as low carbon steel. Guide rails 42 are attached around an outside of the piston head 34 at particular intervals. As shown in FIGS. 1 and 2, four guide rails 42 are shown spaced uniformly about a periphery of the piston head 34.

An electrical connection is made to the coil 40 through the piston rod 32 by lead wires 45 and 47. The first lead wire 45 is connected to a first end of an electrically conductive rod 48 which extends through the piston rod 32 to a Phono-jack connector 46. A center connection of the Phono-jack 46 is connected to a first end 39 of the coil 40. A second end 41 of windings of the coil 40 is attached to a "ground" connection on an outside of the Phono-jack 46. An electrical return path, then, includes the piston rod 32 and the ground lead 47.

However, such an MR shock absorber has some inherent drawbacks. First, since the MR fluid has a higher viscosity than the conventional hydraulic fluid even in the absence of a magnetic field, the MR shock absorber tends to exert a harder damping force against external forces applied thereto, resulting in a deteriorated ride-comfort under certain circumstances. Furthermore, the MR fluid is costly, increasing the manufacturing cost of the shock absorber.

SUMMARY OF THE INVENTION

It is, therefore, an object of the present invention to provide a shock absorber using a magnetorheological fluid and a hydraulic fluid.

In accordance with the present invention, there is provided a shock absorber comprising: a housing; a cylinder secured in the housing, the cylinder including an upper room filled with a magnetorhelogical fluid and a lower room filled with a hydraulic fluid; a piston rod movably inserted in the upper room of the cylinder; a piston movably inserted in the lower room of the cylinder and secured to the piston rod; and a chamber mechanically affixed to the piston rod and including a floating piston, wherein the piston rod further includes at least a first for providing a flowing path for the magnetorheological fluid and the piston further includes at least a second orifice for providing a flowing path for the hydraulic fluid in the lower room of the cylinder.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
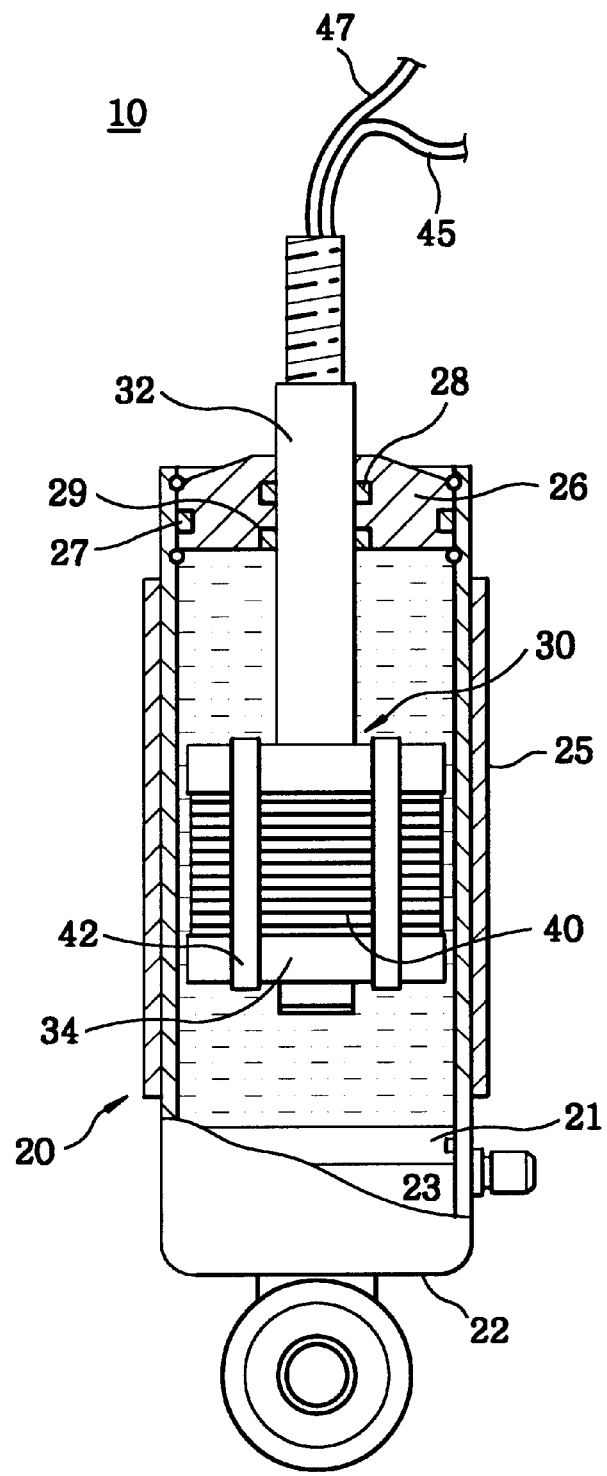
FIG. 1 is a schematic cross sectional view setting forth a shock absorber using a magnetorheological fluid previously disclosed.
Figure 2:
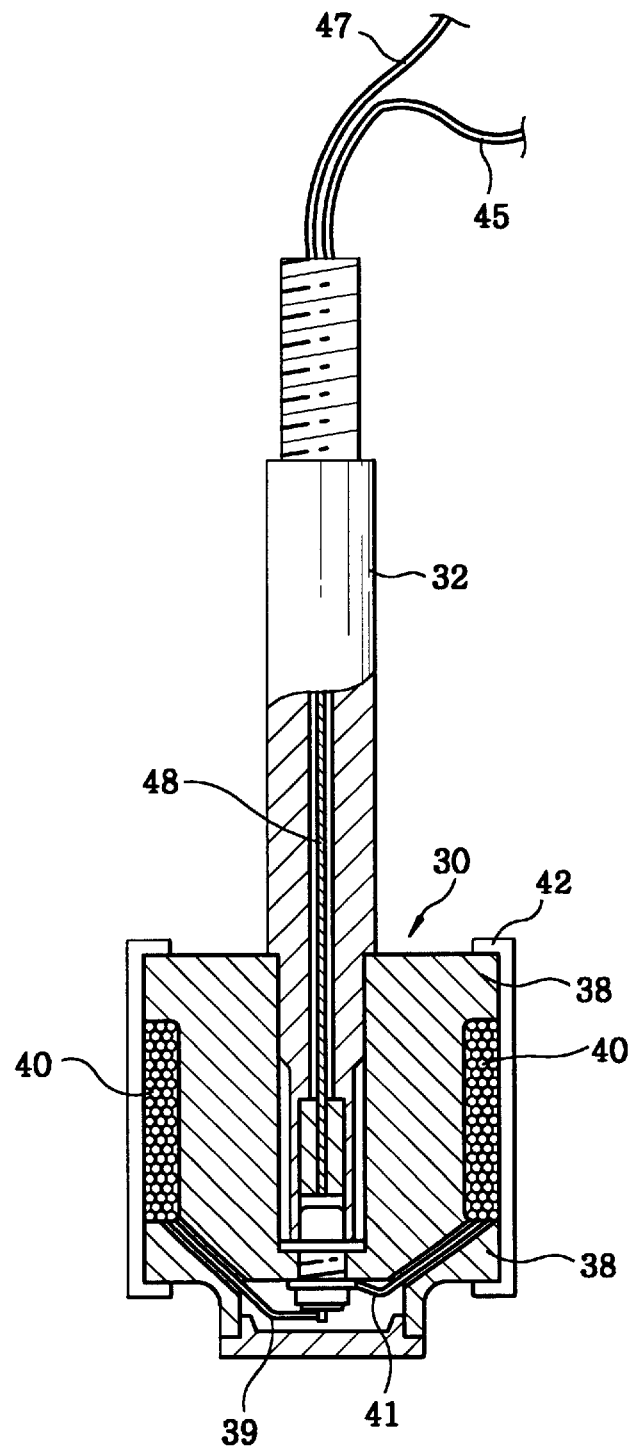
FIG. 2 shows a schematic cross sectional view illustrating a piston assembly incorporated in the shock absorber shown FIG. 1.
Figure 3:
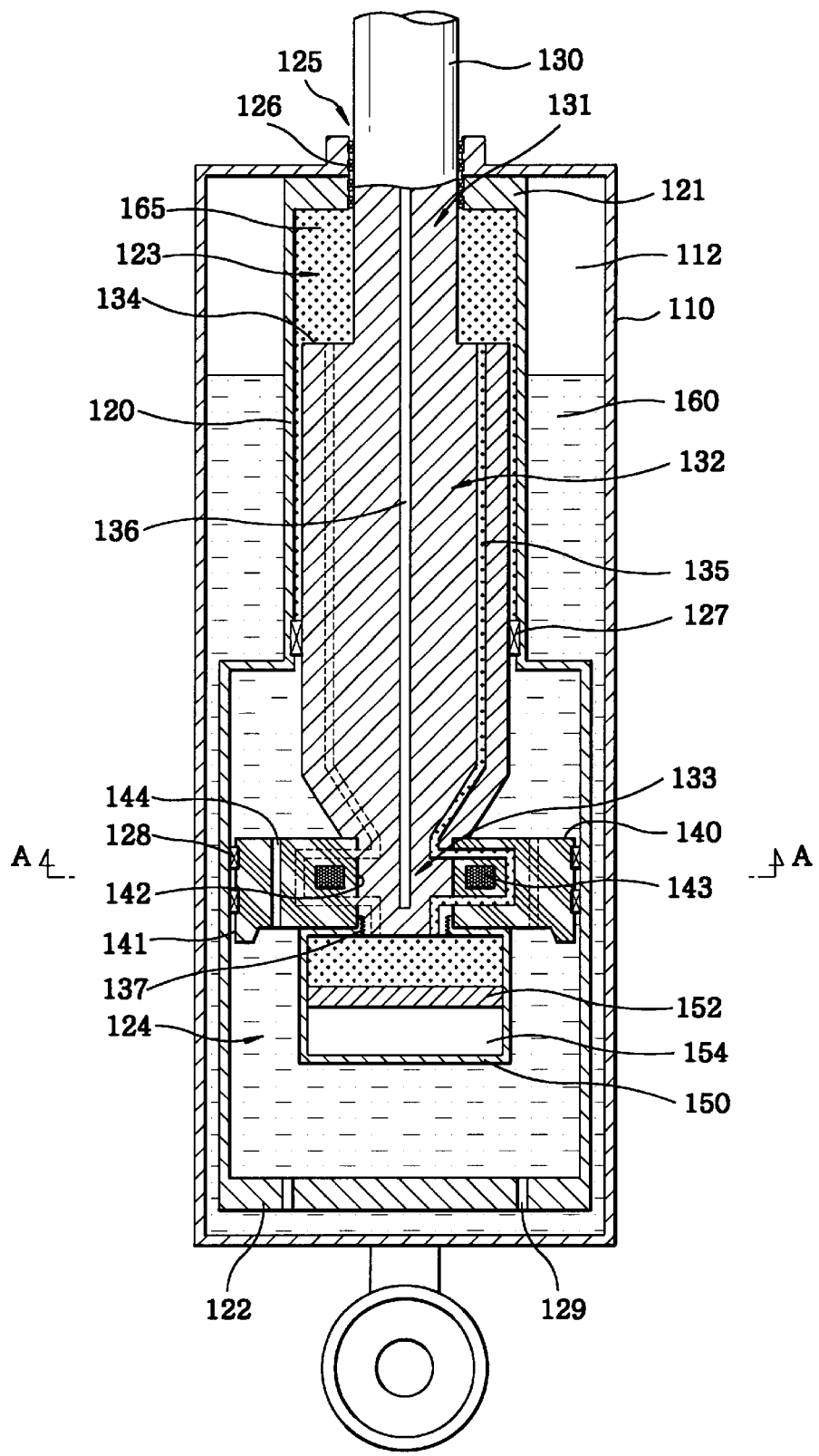
FIG. 3 offers a schematic cross sectional view depicting a shock absorber using a magnetorheological fluid and a hydraulic fluid in accordance with the present invention.

An inventive shock absorber 100 for using in a vehicle, e.g., automobile, includes a housing 110, a cylinder 120, a piston rod 130, a piston 140 and a chamber 150, as shown in FIG. 3.

The housing 110 includes an inner space 112 containing a hydraulic fluid 160 having a constant viscosity.

The cylinder 120 having a first and a second opposite end member 121, 122 is provided with an upper and a lower room 123, 124, the volume of the upper room 123 being smaller than that of the lower room 124, wherein the upper room 123 is filled with a magnetorheological fluid 165 having a changeable viscosity and the lower room 124 is filled with the hydraulic fluid 160. The first end member 121 of the cylinder 120 is secured to the housing 110 with an opening 125 communized therebetween and the second end member 122 of the cylinder 120 is apart from the housing 110 with one or more valve(s) 129 through which the hydraulic fluid 160 can flow between the inner space 112 of the housing 110 and the lower room 124 of the cylinder 120.

The cylinder 120 further includes a first, a second and a third sealing member 126, 127, 128 made of, e.g., Teflon or the like, the first sealing member 126 preventing the magnetorheological fluid 165 in the upper room 123 from flowing out, the second sealing member 127 prohibiting the magnetorheological fluid 165 and the hydraulic fluid 160 from interflowing, and the third sealing member 128 obstructing the hydraulic fluid 160 in the lower room 124 from flowing along with the cylinder 120.

The piston rod 130 having a first, a second and a third part 131, 132, 133 is movably inserted in the cylinder 120 in such a way that the first part 131 is adjacent to the opening 125 of the cylinder 120 and the second part 132 is adjacent to the upper room 123 of the cylinder 120. The dimension of the first part 131 is smaller than that of the second part 132 and due to the difference in the dimensions of the two parts a normal surface 134 is formed in a shape of a disk between the first and the second part 131, 132 to thereby induce volume change of the magnetorheological fluid 165 in the upper room 123 of the cylinder 120 during the reciprocating motion of the piston rod 130. The third part 133 incorporates therein a fastening member 137, e.g., a screw, a rivet, a joint or the like, to mechanically affix the piston rod 130 to the chamber 150.

Figure 4:
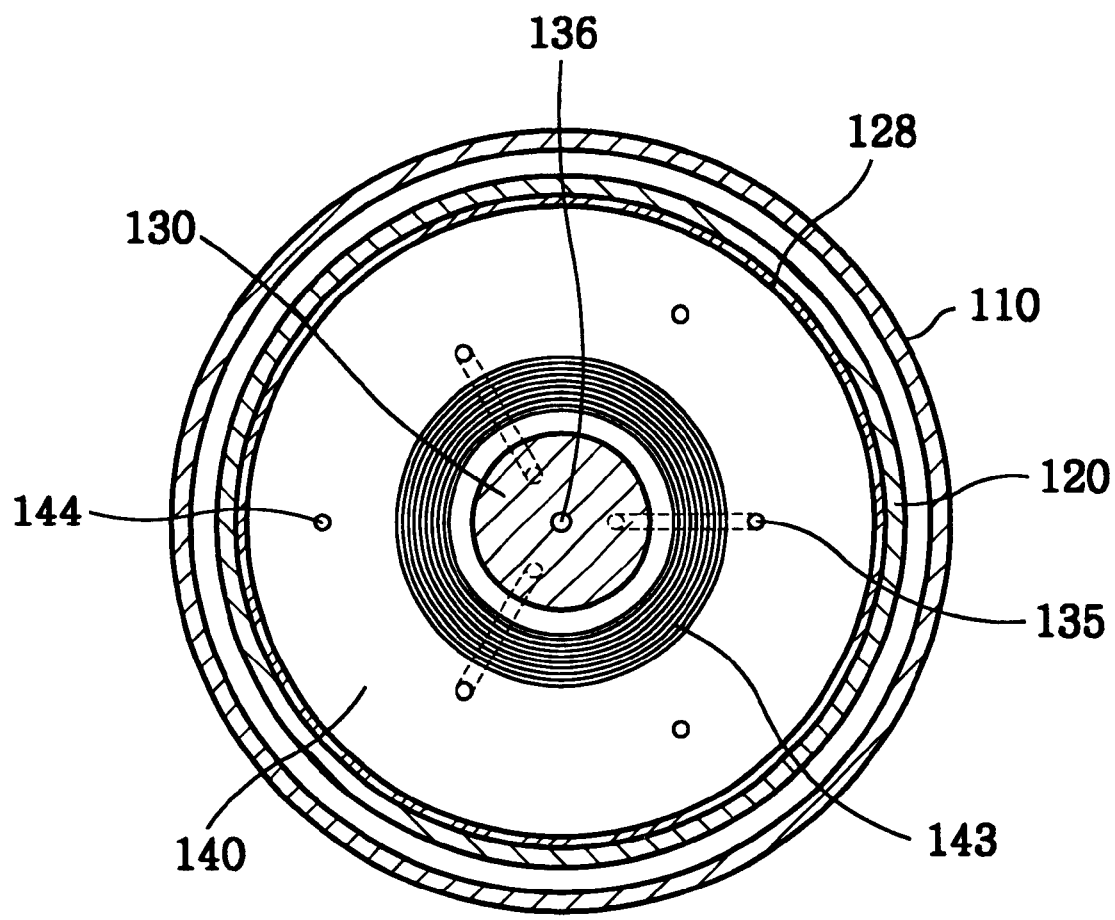
FIG. 4 provides a cross sectional view taken along a line A—A in FIG. 3.

The piston rod 130 further includes an interior cavity 136 and one or more first orifice(s) 135, as shown in FIGS. 3 and 4. The interior cavity 136 extends from the first part 131 to the third part 133 for installing electrical connections (not shown) through which electrical current is applied to the piston 140. The first orifice 135 extends from the normal surface 134 to the chamber 150 via the piston 140 for offering flowing paths to the magnetorheological fluid 165 in the upper room 123 of the cylinder 120.

The piston 140 is provided with an outer and an inner periphery 141, 142, the outer periphery 141 being movably inserted in the lower room 124 of the cylinder 120 and the inner periphery 142 being fixed to the third part 133 of the piston rod 130. The piston 140 includes a coil 143 and one or more second orifice(s) 144, the coil 143 being electrically connected to the electrical connection in the interior cavity 136 of the piston rod 130 and the second orifice 144 extending from top to bottom of the piston 140 for providing flowing paths for the hydraulic fluid 160 in the lower room 124 of the cylinder 120.

The piston 140 is structured to form a magnetic field generator, e.g., solenoid, is made of a magnetically permeable material, e.g., ferrite, low carbon steel or the like, and is convolved with the coil 143. Accordingly, when an electrical current is applied to the coil 143 through the electrical connections, magnetic fields are generated around the piston 140, which will, in turns, modulates the viscosity of the magnetorheological fluid 165 passing through the first orifice 135.

While detail description for the electrical connections is omitted in the present invention, it will be apparent to skilled person in the art that the present invention can achieve the electrical connection by using various devices or methods.

Returning to FIG. 3, the chamber 150 is mechanically affixed to the third part 133 of the piston rod 130 by using the fasten member 137. The chamber 150 includes a floating piston 152 movably inserted therein and an accumulator 154 filled with a gas, e.g., nitrogen, wherein the accumulator 154 is necessary to accommodate the magnetorheological fluid 165 displaced by the piston rod 130 as well as to allow for thermal expansion of the magnetorheological fluid 165.

Figure 5A:
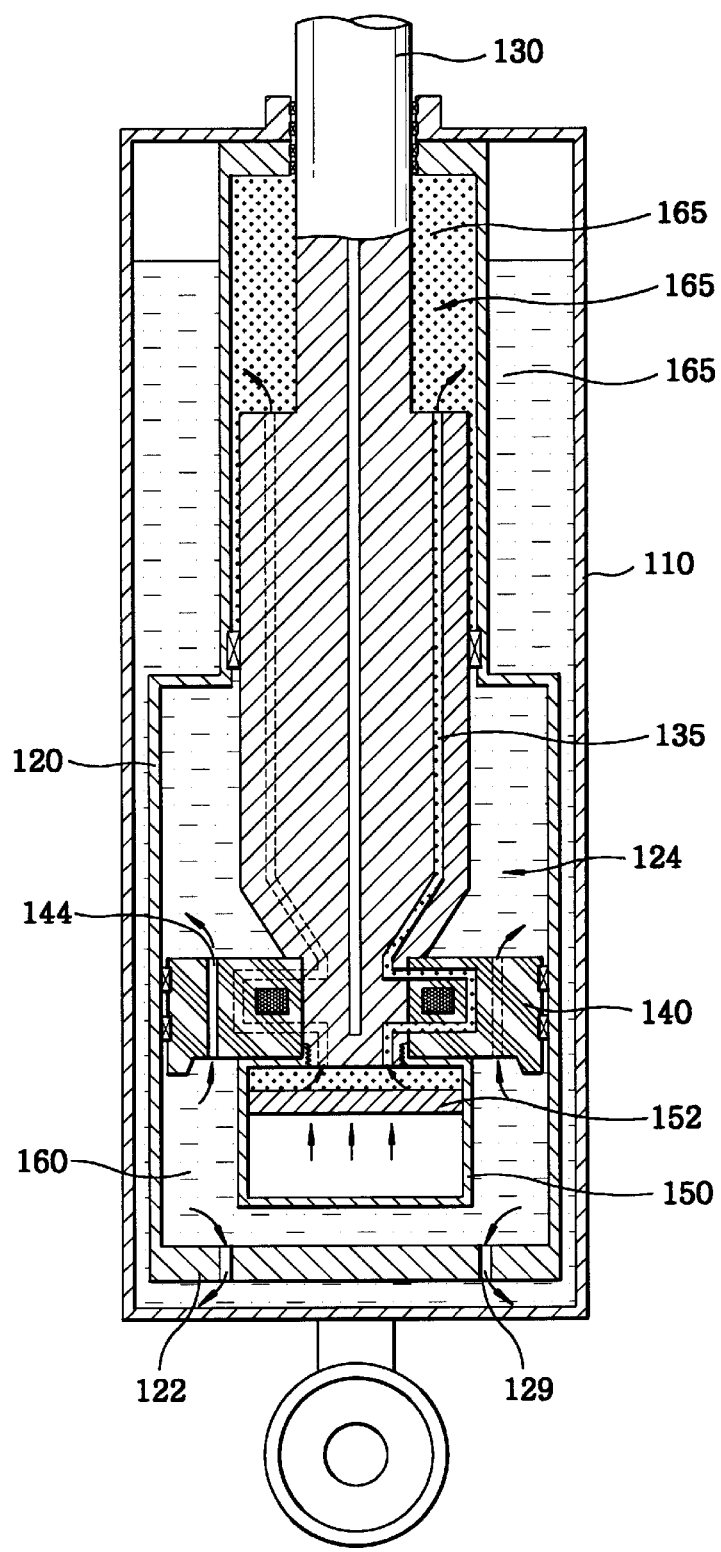
FIGS. 5A and 5B represent cross sectional views portraying successive operations of the shock absorber shown in FIG. 3, respectively.
Figure 5B:
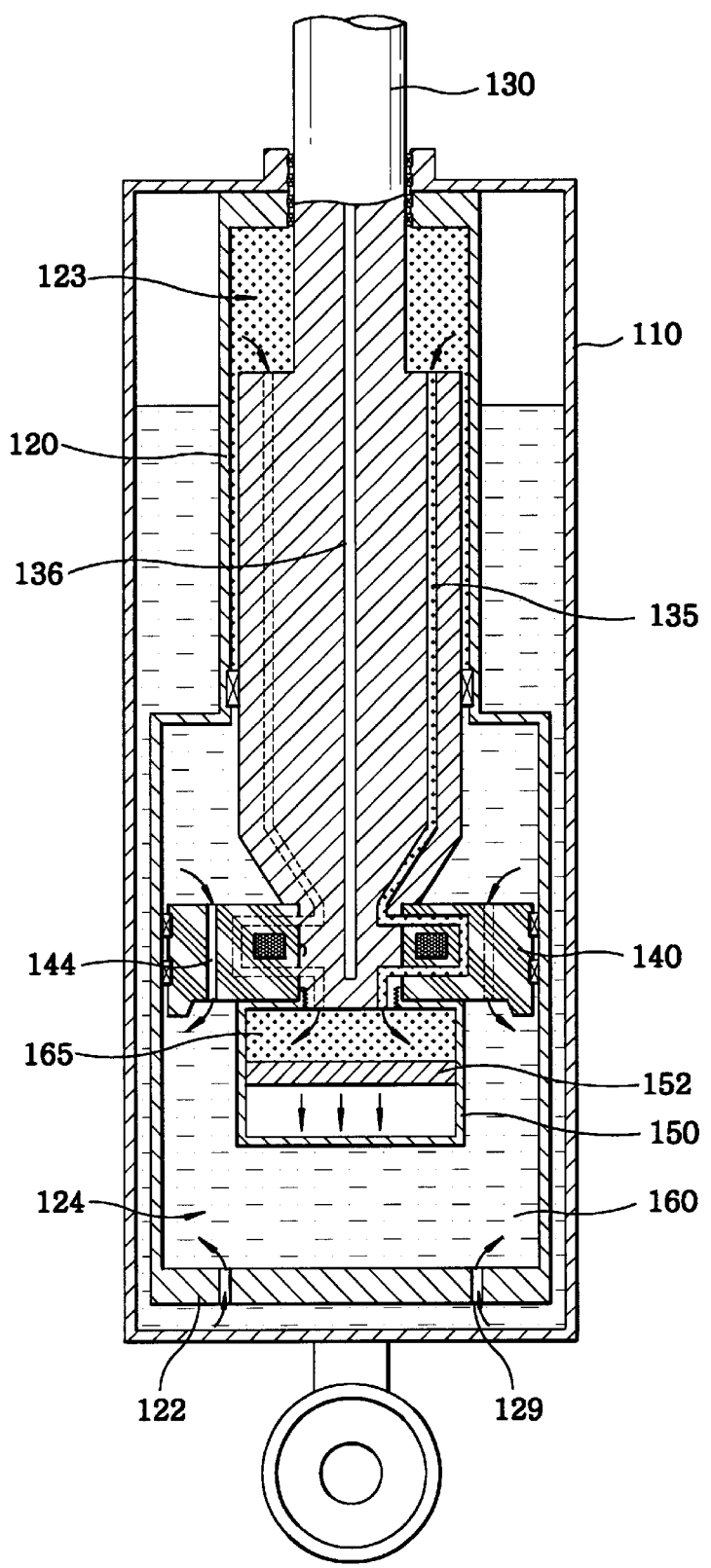

Operations of the shock absorber 100 are described hereafter in accompanying with FIGS. 5A and 5B.

As shown in FIG. 5A, when the housing 110 and cylinder 120 are moved upwardly by the impulse applied thereto, the volume of the upper room 123 in the cylinder 120 is increased while the volume of the lower room 124 in the cylinder 120 is decreased because the piston rod 130 and the piston 140 remain at the previous position. At the same time, the spring (not shown) installed in parallel with the shock absorber 100 is compressed. Accordingly, in order to relieve the pressure difference, the magnetorheological fluid 165 in the chamber 150 flows into the upper room 123 through the first orifices 135, thereby pulling the floating piston 152 upwardly, and the hydraulic fluid 160 in the lower room 124 flows upwardly through the second orifices 144 and into the inner space 112 of the housing 110 through the valve 129.

Thereafter, as shown in FIG. 5B, the piston rod 130 and the piston 140 are moved upwardly by the restorative force of the compressed spring (not shown) installed in parallel with the shock absorber 100, thereby decreasing the volume of the upper room 123 in the cylinder 120 while increasing the volume of the lower room 124 in the cylinder 120. Accordingly, in order to relieve the pressure buildup in the upper room 123, the magnetorheological fluid 165 in the upper room 123 flows into the chamber 150 through the first orifices 135, thereby pushing the floating piston 152 downwardly, and the hydraulic fluid 160 in the lower room 124 flows downwardly through the second orifices 144 as well as the hydraulic fluid 160 in the inner space 112 of the housing 110 flows into the lower room 124 through the valve 129. During this operation, the shock absorber 100 functions as a damper for damping the vibration of the spring (not shown).

As may be seen from the above, it should be appreciated that the shock absorber 100 of the present invention utilizes both the hydraulic fluid 160 and the MR fluid 165. Accordingly, the shock absorber 100 can respond sensitively to the impulse applied thereto by using the hydraulic fluid 160 having relatively low viscosity and can also modulate the damping force by using the MR fluid 165 having adjustable viscosity, wherein the viscosity will be adjusted based on various factors, e.g., driving conditions, driver's controls and so on. Furthermore, the expensive MR fluid 165 is employed only in the upper room 123 of the cylinder 120 and the chamber 150, thereby reducing the amount of the MR fluid 165 and, hence, reducing the manufacturing cost of the shock absorber 100.

While the present invention has been shown and described with respect to the particular embodiments, it will be apparent to those skilled in the art that many changes and modifications may be made without departing from the spirit and scope of the invention defined in the appended claims.

What is claim is:

1. A shock absorber comprising:
   a housing having an inner space containing hydraulic fluid;
   a cylinder including an upper room filled with a magnetorhelogical fluid and a lower room filled with the hydraulic fluid;
   a piston rod movably inserted in the upper room of the cylinder;
   a piston movably inserted in the lower room of the cylinder, secured to the piston rod and structured to form a magnetic field generator; and
   a chamber affixed to the piston rod, wherein the piston rod further includes at least a first orifice for providing a flowing path for the magnetorheological fluid and the piston further includes at least a second orifice for providing a flowing path for the hydraulic fluid in the lower room of the cylinder.

2. The shock absorber of claim 1, wherein the cylinder is provided with a first end member secured to the housing and a second opposite end member apart from the housing.

3. The shock absorber of claim 2, wherein the first end member of the cylinder includes an opening communized with the housing.

4. The shock absorber of claim 2, wherein the second opposite member of the cylinder includes at least a valve for providing a flowing path for the hydraulic fluid between the inner space of the housing and the lower room of the cylinder.

5. The shock absorber of claim 1, wherein volume of the upper room is smaller than that of the lower room in the cylinder.

6. The shock absorber of claim 3, wherein the piston rod is provided with a first, a second and a third part, the first part being adjacent to the opening of the cylinder and the second part being adjacent to the upper room of the cylinder.

7. The shock absorber of claim 1, wherein the first orifice extends from the upper room to the chamber via the piston and the second orifice extends from top to bottom of the piston.

8. The shock absorber of claim 1, wherein the piston is made of a magnetically permeable material and is convolved with the coil, to form a solenoid.

9. The shock absorber of claim 1, wherein the chamber includes a floating piston movably installed therein and an accumulator for accommodating the magnetorheological fluid displaced by the piston rod and for allowing thermal expansion of the magnetorheological fluid.

10. The shock absorber of claim 1 further comprising a first, a second and a third sealing member, the first sealing member preventing the magnetorheological fluid in the upper room from flowing out, the second sealing member prohibiting the magnetorheological fluid and the hydraulic fluid from interflowing, and the third sealing member obstructing the hydraulic fluid from flowing along with in the lower room of the cylinder.

11. A motor vehicle incorporating therein the shock absorber according to the claim 1.

12. A suspension system incorporating therein the shock absorber according to the claim 1.

* * * * *